United States Patent [19]
Wortham

[11] Patent Number: 5,398,190
[45] Date of Patent: * Mar. 14, 1995

[54] VEHICLE LOCATING AND COMMUNICATING METHOD AND APPARATUS

[75] Inventor: Larry C. Wortham, Garland, Tex.

[73] Assignee: HM Holding Corporation, Dallas, Tex.

[*] Notice: The portion of the term of this patent subsequent to Oct. 13, 2009 has been disclaimed.

[21] Appl. No.: 178,022

[22] Filed: Jan. 6, 1994

Related U.S. Application Data

[63] Continuation of Ser. No. 920,644, Jul. 28, 1992, Pat. No. 5,299,132, which is a continuation of Ser. No. 642,436, Jan. 17, 1991, Pat. No. 5,155,689.

[51] Int. Cl.$^6$ ................................................ G01S 3/02
[52] U.S. Cl. ..................... 364/460; 364/449; 340/990; 340/995; 342/457
[58] Field of Search ............. 364/448, 449, 460; 340/990–995; 342/450, 451, 457, 463; 379/58, 59, 200, 60; 455/67, 92, 99, 33

[56] References Cited

U.S. PATENT DOCUMENTS

| | | | |
|---|---|---|---|
| Re. 34,034 | 8/1992 | O'Sullivan | 379/59 |
| 4,445,118 | 4/1984 | Taylor et al. | 343/357 |
| 4,651,157 | 3/1987 | Gray et al. | 342/457 |
| 4,700,374 | 10/1987 | Bini | 379/60 |
| 4,740,792 | 4/1988 | Sagey et al. | 342/457 |
| 4,750,197 | 6/1988 | Denekamp et al. | 379/58 |
| 4,754,465 | 6/1988 | Trimble | 375/1 |
| 4,791,572 | 12/1988 | Green, III et al. | 364/449 |
| 4,809,005 | 2/1989 | Counselman, III | 342/352 |
| 4,833,477 | 5/1989 | Tendler | 342/389 |
| 4,833,701 | 5/1989 | Comroe et al. | 379/60 |
| 4,901,340 | 2/1990 | Parker et al. | 379/60 |
| 4,907,290 | 3/1990 | Crompton | 455/56 |
| 4,912,756 | 3/1990 | Hop | 379/60 |
| 4,953,198 | 8/1990 | Daly et al. | 379/61 |
| 5,003,317 | 3/1991 | Gray et al. | 342/457 |
| 5,014,206 | 5/1991 | Scribner et al. | 364/449 |
| 5,025,253 | 6/1991 | DiLullo et al. | 340/825.06 |
| 5,032,845 | 7/1991 | Velasco | 342/457 |
| 5,043,736 | 8/1991 | Darnell et al. | 342/357 |
| 5,055,851 | 10/1991 | Sheffer | 342/457 |
| 5,068,656 | 11/1991 | Sutherland | 340/989 |
| 5,090,050 | 2/1992 | Heffernan | 379/60 |
| 5,142,281 | 8/1992 | Park | 340/991 |
| 5,142,654 | 8/1992 | Sonberg et al. | 379/59 |
| 5,159,625 | 10/1992 | Zicker | 379/59 |
| 5,166,694 | 11/1992 | Russell et al. | 342/457 |
| 5,208,756 | 5/1993 | Sony | 364/449 |
| 5,235,633 | 8/1993 | Dennison et al. | 379/60 |

FOREIGN PATENT DOCUMENTS

| | | |
|---|---|---|
| 0242099 | 10/1987 | European Pat. Off. |
| 0290725 | 11/1988 | European Pat. Off. |
| 0367935 | 5/1990 | European Pat. Off. |
| 3516357 | 11/1986 | Germany |
| WO8904035 | 5/1989 | WIPO |

OTHER PUBLICATIONS

"TRIMPACK Technical Specifications," *Trimble Navigation*, May, 1989.

James C. Reynolds, et al., "GPS-Based Vessel Position Monitoring and Display System," *IEEE Plans '90 Position Location and Navigation Symposium*, Aug., 1990, pp. 601–607.

R. DeSadaba, "Personal Communications in the Intelligent Network," *British Telecommunications Engineering*, vol. 9, Aug., 1990, pp. 80–83.

*Primary Examiner*—Michael Zanelli
*Attorney, Agent, or Firm*—Baker & Botts

[57] ABSTRACT

A method and apparatus for locating and communicating with vehicles is provided, including at least one mobile cellular unit connected to at least one microprocessor and installed within a vehicle. The microprocessor interrogates the mobile cellular unit to obtain location information from an overhead message stream transmitted from cellular telephone transmitter sites. The location is displayed on a display located in the vehicle or the microprocessor periodically instructs the mobile cellular unit to initiate a call to a host controller and, upon receipt of transmitting instructions from the host controller, transmits the location information for display on a screen connected to the host controller.

24 Claims, 6 Drawing Sheets

VEHICLE LOCATING AND COMMUNICATING METHOD AND APPARATUS

CROSS REFERENCE TO RELATED APPLICATIONS

This application is a continuation of U.S. application Ser. No. 07/920,644, filed Jul. 28, 1992, now U.S. Pat. No. 5,299,132, entitled "Vehicle Locating and Communicating Method and Apparatus Using Cellular Telephone Network" by Larry C. Wortham, which is a continuation of U.S. application Ser. No. 07/642,436, filed Jan. 17, 1991, now U.S. Pat. No. 5,155,689, entitled "Vehicle Locating and Communicating Method and Apparatus" by Larry C. Wortham.

TECHNICAL FIELD

This invention relates to methods and apparatus for locating and communicating from a central location with vehicles traveling in various geographical areas, and more particularly, to a method and apparatus for locating and communicating with vehicles through use of a voice activated mobile cellular telephone installed in the vehicle, and visually displaying at the central location the geographical location of each vehicle and vehicle information automatically communicated to the central location.

BACKGROUND OF THE INVENTION

Historically, in industries utilizing multiple vehicles traveling in various geographical regions, such as in the long haul trucking industry, drivers of the vehicles must periodically communicate with a base or home office to report information such as present location of the vehicle, the number of hours driven and any problems experienced with the vehicle. In such industries where there is a need to determine the geographical location of a vehicle, tracking systems utilizing Loran-C receivers and microwave transmitters have been employed for vehicle location. Use of such equipment tends to be limited solely to locating and tracking the vehicles. In many instances, the only means of locating a vehicle in service consists of the driver of the vehicle stopping, getting out of the vehicle, and calling a report into the home base on a public pay phone. To date, the cellular industry has failed to penetrate the trucking market and other industries where vehicle locating is desired for such reasons as high start-up costs for obtaining terminal equipment and high operating costs.

SUMMARY OF THE INVENTION

The locating and communicating method and apparatus of the present invention overcome the foregoing and other problems associated with the prior art utilizing existing cellular telephone system services and information. A microprocessor interrogates a cellular telephone located in the vehicle to obtain location information received by the cellular phone in an overhead message stream transmitted from the particular cellular system providing service at the time of the interrogation. A call is initiated from the cellular telephone to a host controller for display of the location of the vehicle on a map and textual display of any other vehicle information transmitted from the vehicle. A voice activation/recognition device is connected to the microprocessor and a hands-free microphone and a speaker are connected to the voice activation/recognition device to allow for hands free operation of the system by the driver of the vehicle.

In a second embodiment of the invention, the entire system is located within the vehicle. The microprocessor interrogates the cellular phone to obtain location information from the message stream, processes the information, then causes the information to be displayed on a connected display.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
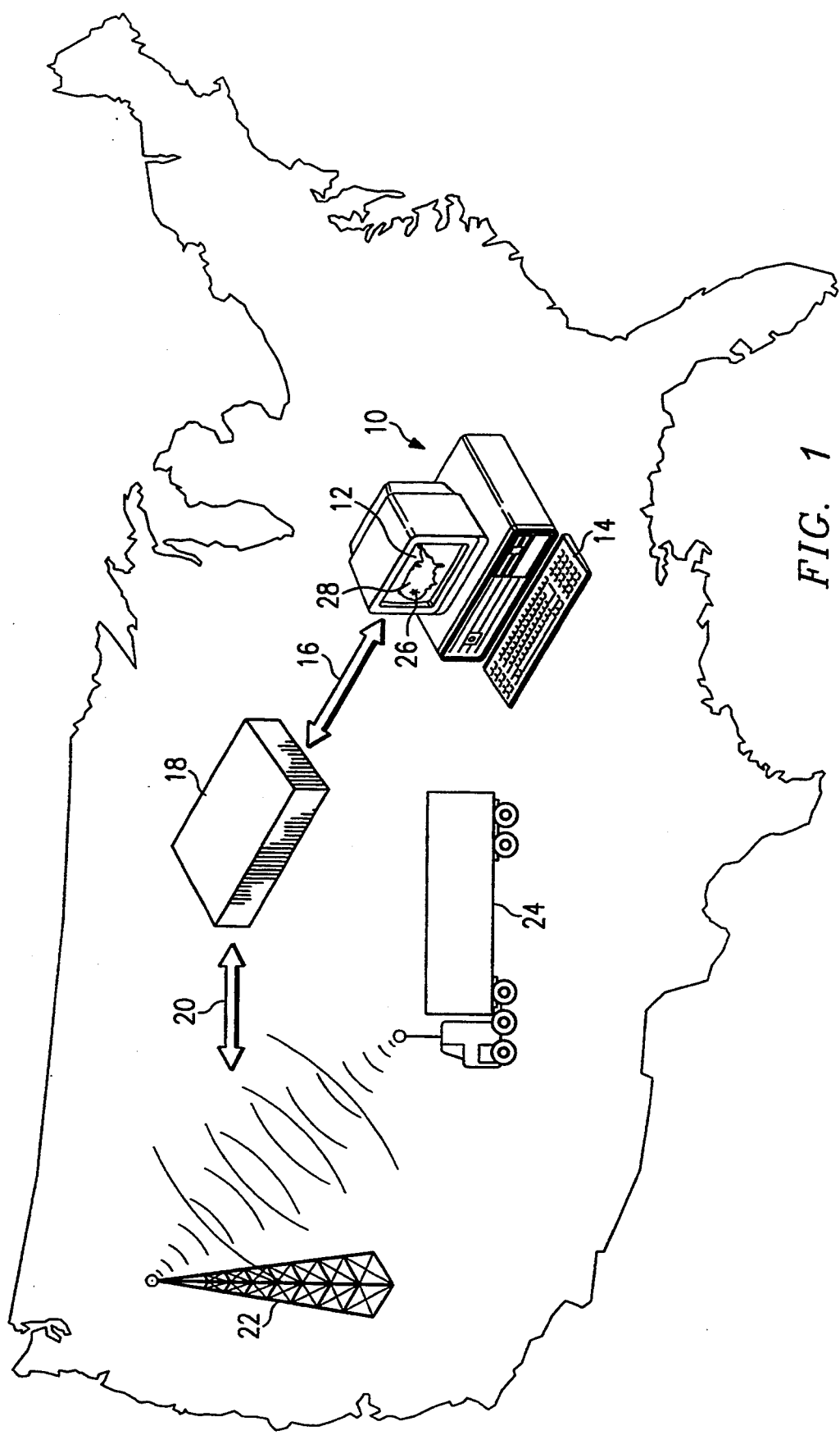
FIG. 1 is a diagram illustrating communication between the vehicle and the host controller of the present invention over a mobile cellular system.

Referring now to the Drawings, and more particularly to FIG. 1 wherein there is shown an illustration of the locating and communicating system of the present invention incorporating a central data gathering device or host controller 10 having a display 12 and a keyboard 14 connected thereto. The host controller 10 communicates as shown by directional arrow 16 with a mobile telephone switching office 18 in turn communicating as indicated by directional arrow 20 with a particular cell transmitter 22 for transmitting and receiving signals from a vehicle 24 equipped with a mobile cellular transceiver (not shown) connected to at least one microprocessor (not shown).

As shown in FIG. 1, an overhead message stream containing cellular system identification information, including the SID number and, where transmitted, the cell identification number and transmitter site coordinates, is transmitted from the cell transmitter 22 and received by the in-vehicle portion of the locating and communicating system (not shown). The signal is then read by the in-vehicle portion of the locating and communicating system to determine the existence of sufficient signal strength for transmission from the vehicle 24. Upon reading a sufficient signal strength and/or lapse of a predetermined time period, a report is automatically transmitted from the vehicle 24 to the cell transmitter 22, from where the signal is carried, as indicated by directional arrow 20, to the mobile telephone switching office 18, and from there to the host controller 10 as indicated by directional arrow 16.

The information received is read by the host controller 10 and looked up in a database associated therewith and containing SID numbers, roamer numbers, cell identification numbers, and transmitter site coordinates, to determine the location of the reporting vehicle 24. The location 26 of the vehicle 24 is then highlighted on a map 28 displayed on the screen 12 connected to the host controller 10. At that point, the operator of the host controller 10 obtains the telephone number necessary to initiate a telephone call to the vehicle 24 utilizing the keyboard 14 to call up the telephone number from the database associated with the host controller 10.

Long haul truckers must periodically report to the base terminal or home office information such as the total number of driver hours, any problems with the vehicle, scheduling changes, status of the cargo, as well as any other information needed by the home office. To maintain current information, the locating and communicating system of the present invention provides for automatic periodic reporting of such information to the home office. The report is initiated in the in-vehicle portion of the system.

Figure 2:
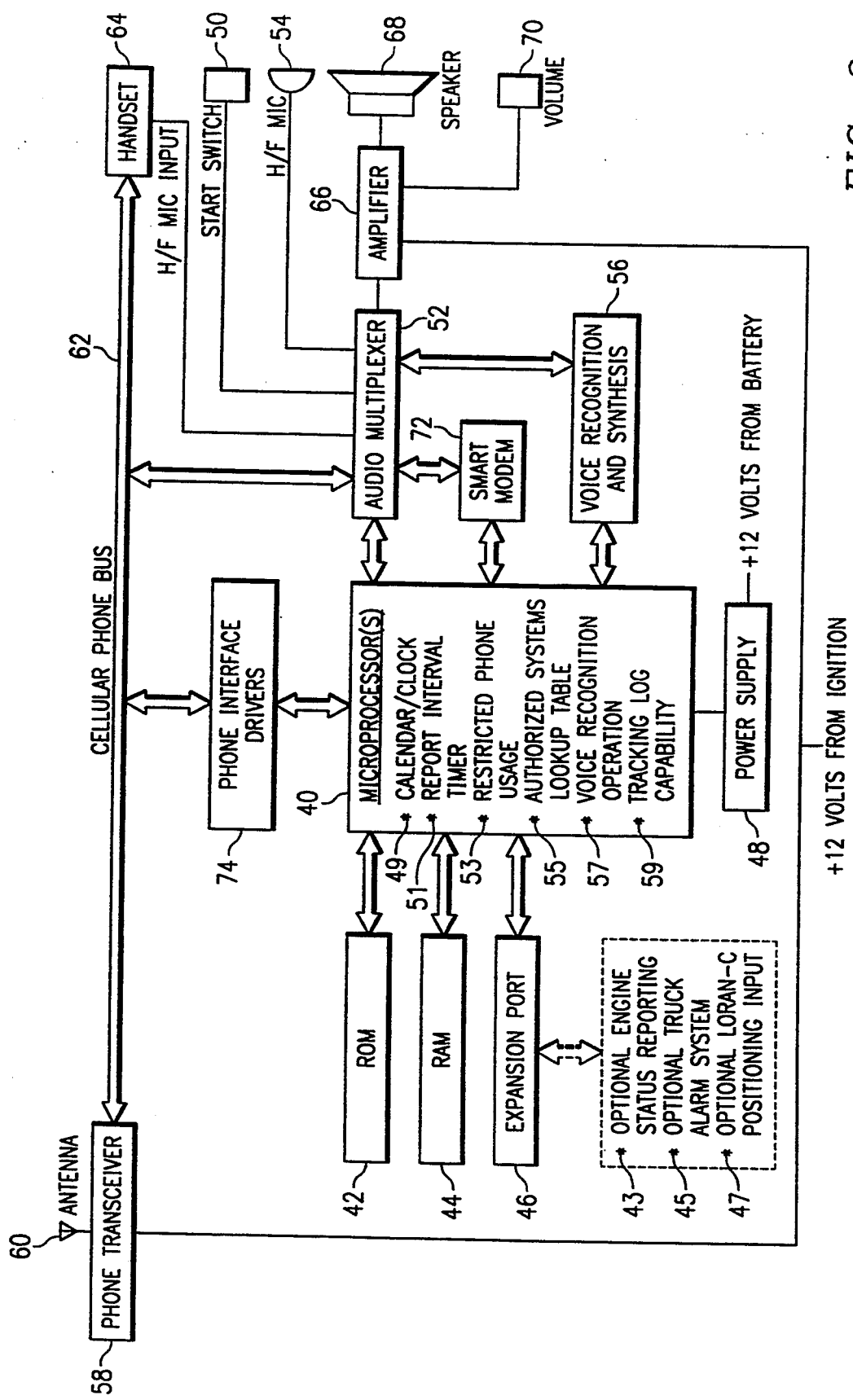
FIG. 2 is a block diagram of the in-vehicle portion of the locating and communicating system of the present invention.

As illustrated in the block diagram of FIG. 2, the in-vehicle portion of the system is comprised of a microprocessor 40 having an associated read only memory ("ROM") 42, an associated random access memory ("RAM") 44, and an expansion port 46 for options (shown in broken lines) including, automatic reporting of engine status, a truck alarm system, and Loran-C positioning input to allow for location of the vehicle using Loran-C in addition to cellular communication.

The ROM 42 contains the necessary control programs for operation of the in-vehicle portion of the system. The RAM 44 is available for storing operating instructions remotely programmable from the host controller 10.

In an attempt to monitor vehicle conditions, the optional engine status reporting feature 43 provides for reading by the microprocessor of engine conditions such as temperature, engine speed, and oil pressure. In the event of theft of the vehicle, the optional truck alarm system 45 alerts the microprocessor to instruct the mobile cellular transceiver 58 to initiate a call to report the theft of the vehicle. To allow locating utilizing existing tracking system information, the optional Loran-C positioning input 47 provides for the receipt of Loran-C positioning transmissions.

A power supply 48 is connected to the vehicle battery to provide electrical energy for operating the microprocessor 40. A start switch 50 actuates an audio multiplexer 52 for receiving driver input through a hands-free microphone 54. The input from the hands free microphone 54 is then passed through the audio multiplexer 52 to voice recognition and synthesis 56 for conversion to digital form readable by the microprocessor 40.

Information is also received by the microprocessor 40 from the host controller through the mobile cellular transceiver 58 located in the vehicle. Cellular radio signals are received by the mobile cellular transceiver 58 connected to a vehicle antenna 60. The signals are then transmitted over the cellular phone bus 62 through the audio multiplexer 52 and a smart modem 72 to the microprocessor 40. The microprocessor 40 is connected to the audio multiplexer 52 through the smart modem 72 to allow extraction of the digital information from the analog signal and for modulation of the information transmitted from the microprocessor 40. An interface 74 provides the necessary protocol for communication between the microprocessor 40 and the mobile cellular unit.

In the event of audio communication between the operator of the host controller and the driver, the signals are transmitted from the transceiver 58 over the cellular phone bus 62 to the handset 64 of the mobile cellular unit. If the driver of the vehicle elects to use the hands free microphone 54, instead of the handset 64, for audio communication with the operator of the host controller, the audio communication travels from the cellular phone bus 62 through the audio multiplexer 52 to an amplifier 66 for broadcast to the vehicle driver through a speaker 68. The volume of the broadcast is regulated by a volume control 70 controlling the amplifier 66.

Operating energy is provided to the amplifier 66 and cellular telephone transceiver 58 from the vehicle ignition. When the driver is verbally communicating over the cellular telephone, he may speak through either the hands-free microphone 54 or may lift and speak through the handset 64. For storage of information through voice recognition, the hands-free microphone may be used.

As shown in the block diagram of FIG. 2, the microprocessor 40 connected to the mobile cellular unit has connected thereto a calendar and clock 49 for documenting the date and time of storing and/or transmitting information. A report interval timer 51 provides for determining when to initiate a call to the host controller based upon the expiration of a predetermined time period remotely programmed by the host controller and stored in the RAM 44.

To inhibit calls made from the mobile unit to numbers unauthorized by the home office, the microprocessor 40 has a restricted phone usage function 53 that searches a list of authorized phone numbers remotely programmed by the host controller and stored in the RAM 44. The numerical keys of the handset of the cellular phone are disabled. Thus, the authorized numbers may only be accessed through voice command. If the number entered through voice command is not contained in the list of authorized numbers, the call is automatically inhibited. Similarly, the authorized systems look-up table 55 prevents initiation of a call when the SID number contained in the message stream at the time of interrogation is not contained within said look-up table.

The voice recognition operation 57 of the microprocessor 40 provides for receiving and storing of information in a memory connected to the mobile cellular transceiver upon receipt of verbal input from the driver of the vehicle. In addition to reading and transmitting information, the microprocessor 40 has tracking log capabilities 59 for recording and storing vehicle information for extended reporting periods for subsequent report compilation.

Figure 3:
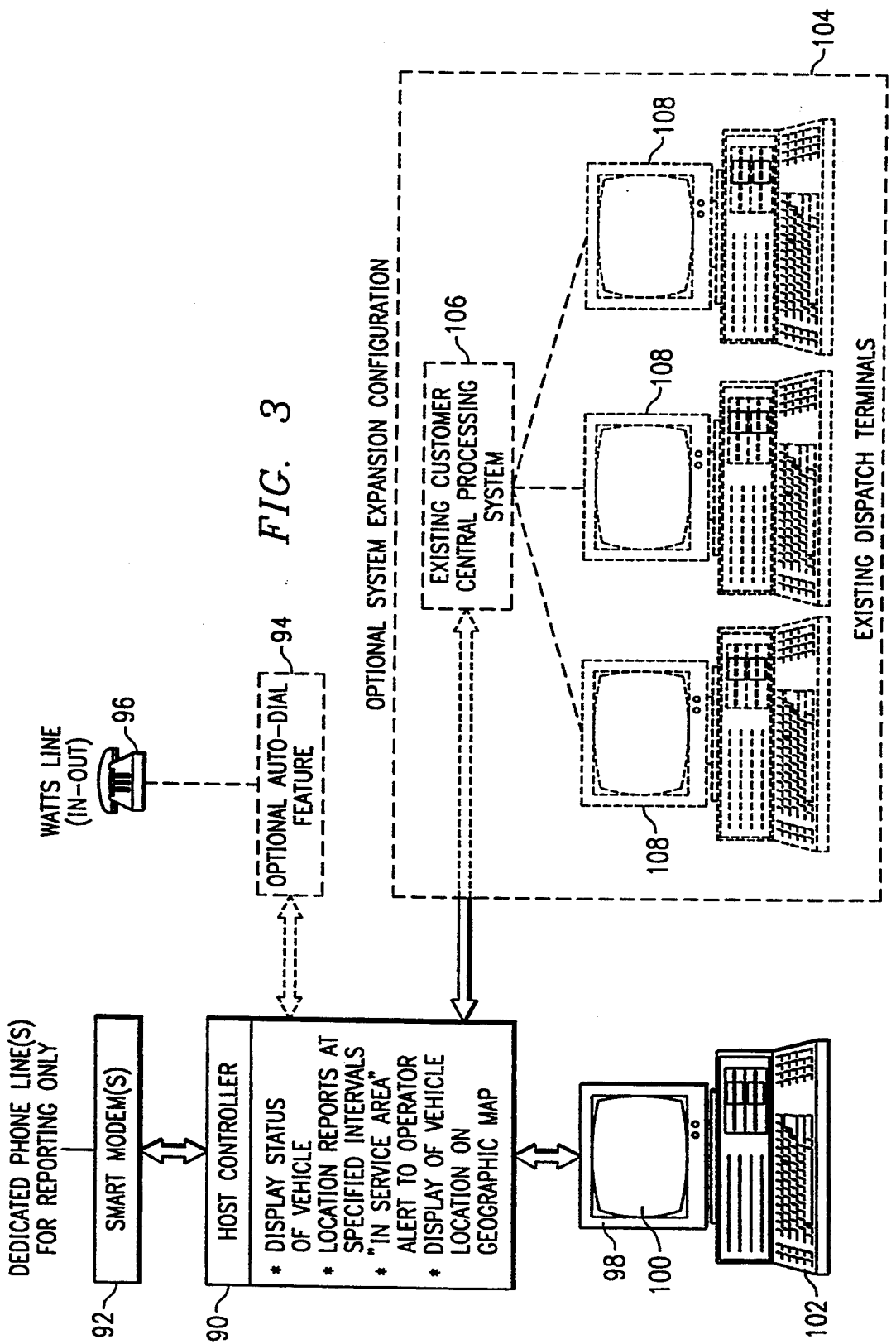
FIG. 3 is a block diagram of the host controller portion of the locating system of the present invention.

As shown in the block diagram of FIG. 3, the central data gathering device or host controller portion of the locating system of the present invention comprises a host controller 90 connected to a smart modem 92 to allow communication between the controller 90 and any number of telephone lines dedicated for vehicle reporting only. Associated with the host controller 90 is an optional auto dial feature 94 (shown in broken lines) for initiating calls over a WATS line 96. Calls are initiated to, as well as calls received from, the vehicle over the WATS line 96.

Connected to the host controller is at least one terminal 98. In the case of larger companies, an optional system expansion configuration 104 (shown in broken lines) utilizing an existing customer processing system 106 and existing dispatch terminals 108, may be utilized to reduce system installation costs. Each terminal 98 has a screen 100 for displaying a map, location information regarding each reporting vehicle, and textual information reported by each vehicle. A keyboard 102 is connected to each terminal 98 for remote programming of authorized telephone numbers for storage in the RAM 44 associated with the microprocessor 40, to allow the host operator to access databases containing telephone numbers for the various locations of the reporting vehicles, to allow menu selection, and to allow remote programming of the report time interval in the microprocessors located in each of the vehicles.

Through an error correcting protocol, the host controller 90 instructs the microprocessor 40 through the mobile cellular transceiver 58 to transmit information to the host controller. The host controller 90 receives said input through the smart modem 92 from the reporting vehicle. The information is read by the host controller 90 and location information looked up in a database associated therewith. The location information of the vehicle is then displayed on the screen 100 of the terminal 98. An in-service area alert is actuated to advise the operator of the host controller 90 of the entry of a reporting vehicle into a strong signal reporting area to allow the operator of the host controller to initiate contact with the reporting vehicle.

In the event the operator of the host controller needs to initiate contact with a vehicle, requiring location of the vehicle, between reporting periods, the operator of the host controller 90 pulls up information regarding the last reporting time and location of the vehicle. Through use of the connected keyboard 102, the operator then inputs the final destination of the vehicle. The host controller 90 then determines the approximate route of the vehicle, calculates the average speed of the vehicle using previously reported driver hours and distance traveled to determine the approximate distance traveled since the last reporting period, thereby determining the approximate location of the vehicle. Cellular numbers for a predetermined area surrounding the approximate location of the vehicle are looked up in the database and are automatically dialed by the host controller 90 at predetermined intervals until contact is made with the vehicle.

Figure 4:
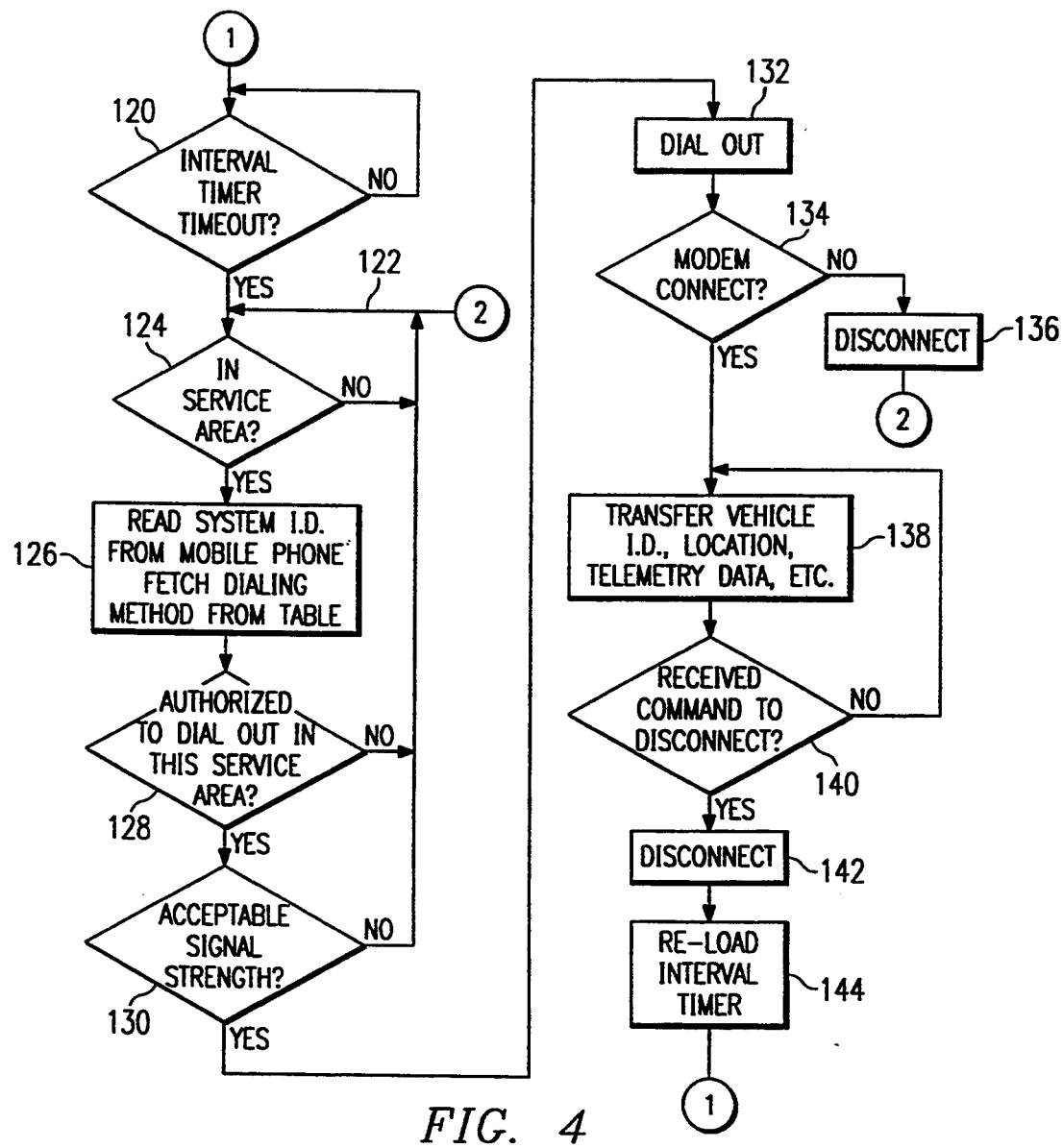
FIG. 4 is a flow chart of the operation of the in-vehicle portion of the locating and communicating system of the present invention.

The method of transmission from the in-vehicle portion of the locating system of the present invention is shown the flow chart of FIG. 4, with reference to the block diagram of FIG. 2. Initially, the microprocessor 40 determines if a predetermined period of time has elapsed (at 120), with the time interval having been remotely programmed by the host controller 10. If the interval has not lapsed, the microprocessor 40 continues to cycle until such time as a determination is made that the predetermined time period has elapsed. At that point, the microprocessor 40, through the interface 74, interrogates (at 122) the mobile cellular transceiver 58 located in the vehicle to read the signal strength being received by the mobile cellular transceiver 58 to determine whether the vehicle is in a cellular system service area (at 124). If the vehicle is in a cellular system service area, the microprocessor will read the SID number (at 126) from the information received by the mobile cellular transceiver 58 from the overhead message stream, and will look up the SID number (at 126) from the database installed therein to determine the appropriate dialing method to initiate a call from the mobile cellular transceiver to the host controller.

The microprocessor 40 then makes a determination as to whether the microprocessor has been remotely programmed by the host controller 10 to authorize the vehicle to dial out in the particular cellular system service area (at 128) providing service to the mobile cellular unit. If the call is authorized, the microprocessor 40 then determines (at 130) whether the signal strength being received by the mobile cellular transceiver 58 is sufficient to authorize initiation of a call from the vehicle to the host controller 10. If the vehicle is not authorized to dial out of the service area, or if the signal strength is not sufficient, the microprocessor 40 will return to the step of determining whether the vehicle is in a service area (at 124) and will continue through each of the steps (at 126, 128, and 130) until a determination is reached that the vehicle is authorized to dial out of the service area and that the mobile cellular transceiver 58 is receiving an acceptable signal strength for initiating a call. At that point, the microprocessor will instruct the mobile cellular unit to dial out (at 132).

After the number has been dialed, the microprocessor 40 determines whether the call has been completed to the smart modem 92 (at 134) connected to the host controller 90 at the terminal or home office. If a determination is made that the call has not resulted in a connection with the smart modem 92, the microprocessor 40 instructs the mobile cellular unit to hang up (at 136). If, however, the call has gone through, the microprocessor 40 receives instructions from the host controller 90 to transfer predetermined information to the host controller. In accordance with said instructions, the microprocessor 40 transmits (at 138) the particular vehicle identification number, the location information obtained from the overhead message stream through interrogation of the mobile cellular unit, and telemetric data regarding such information as vehicle system status, driver hours, and any other information stored in the memory associated with the mobile cellular transceiver 58.

Once the transfer of information is complete, the microprocessor 40 receives a command from the host controller 90 to disconnect (at 140). Upon receipt of the command to disconnect, the microprocessor instructs the mobile cellular transceiver 58 to disconnect (at 142) the call to the host controller 90.

After disconnect or hanging up of the call to the host controller 90, the microprocessor 40 reloads the interval timer (at 144) to determine the lapse of the predetermined time period in which to initiate the next automatic report from the vehicle to the host controller 90. Each time the predetermined time period elapses, each of the steps set forth in the flow chart of FIG. 4 are automatically performed to initiate transmission of a report from the microprocessor through the mobile cellular unit over the cellular telephone system to the host controller where the information is read, looked up, displayed, and stored by the host controller for subsequent compilation into a detailed report covering varying time periods and any number of reporting vehicles.

Figure 5:
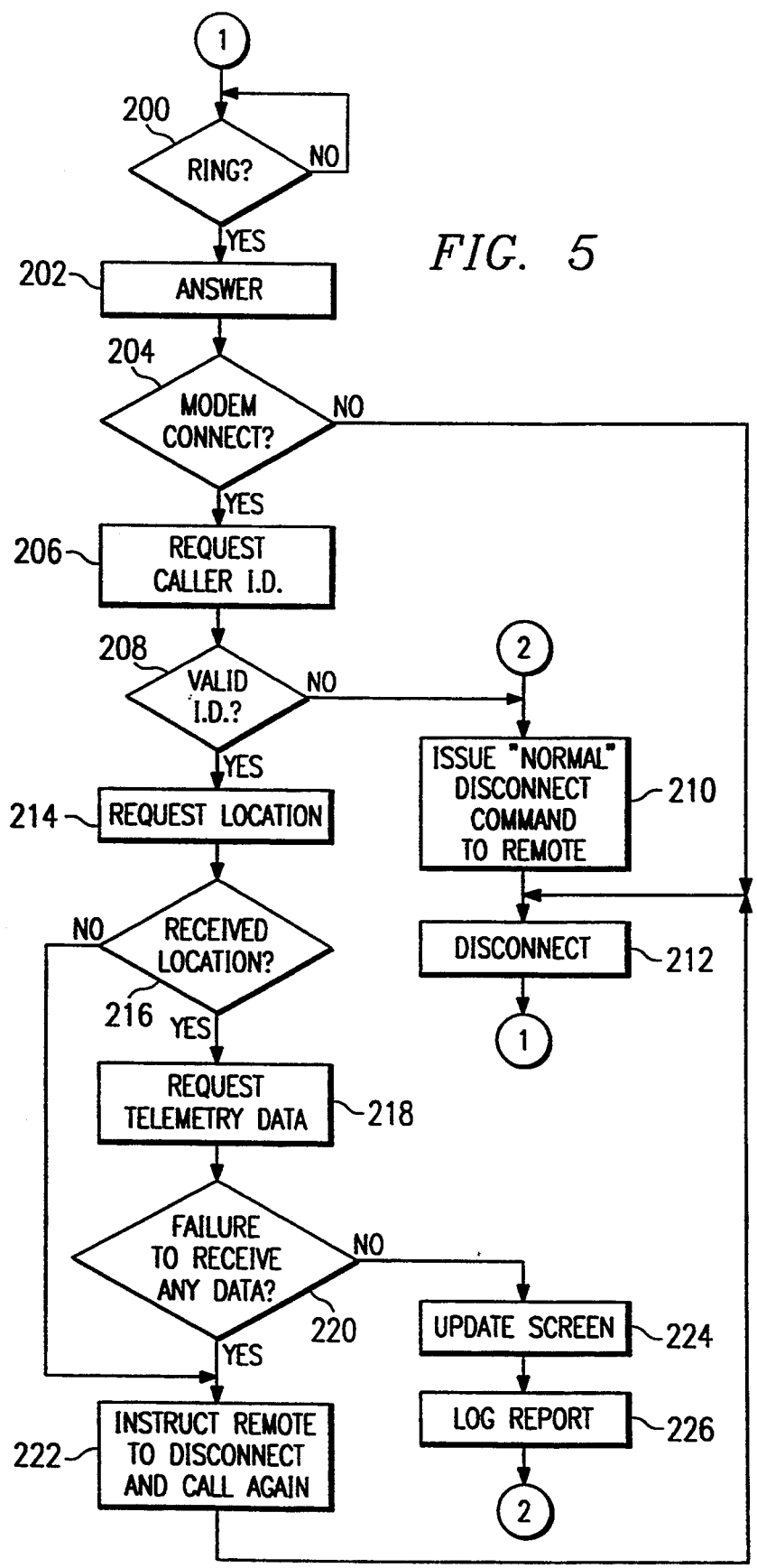
FIG. 5 is a flow chart of the operation of the host portion of the locating and communicating system of the present invention.
Figure 6:
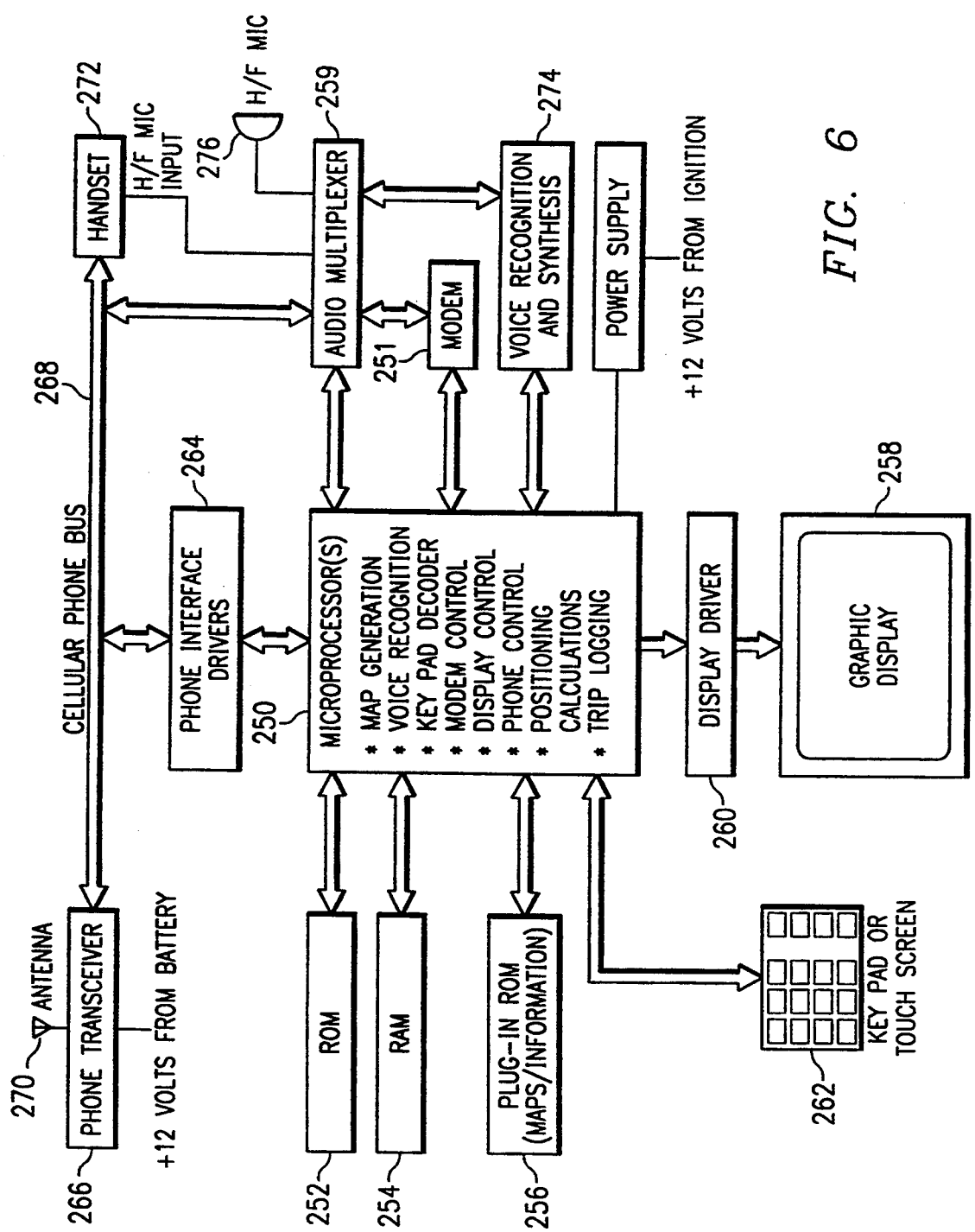
FIG. 6 is a block diagram of the hardware of an in-vehicle locating system incorporating a second embodiment of the present invention.

Referring now to FIG. 5, there is shown a flow chart of the operation of the central data gathering device or host controller portion of the locating system. As illustrated in FIG. 5, with reference to the block diagram of FIG. 3, when a call is initiated by a reporting vehicle to the host controller 90, the phone connected to the host controller rings (at 200) and is answered (at 202). Upon connection with the host controller 90 (at 204) through the smart modem 92 the host controller 90 interrogates (at 206) the microprocessor of the reporting vehicle to determine the vehicle identification number. The host controller 90 then looks up the identification number to determine (at 208) whether the identification number is valid. If the vehicle identification number is invalid, the host controller 90 will instruct the mobile cellular phone in the vehicle to disconnect (at 210), resulting in the mobile cellular unit hanging up on the call (at 212).

Upon determining that a valid vehicle identification number has been reported, the host controller 90 instructs the in-vehicle microprocessor (at 214) to transmit information regarding the location of the reporting vehicle. Upon receipt of the location information (at 216), the host controller 90 instructs (at 218) the microprocessor to transmit telemetric data regarding various vehicle systems. If the host controller fails (at 220) to receive data from the vehicle, it will instruct (at 222) the mobile cellular unit of the vehicle to disconnect and initiate a new call. If the information is received by the host controller 90, the screen 100 of the terminal 98 is updated (at 224) to display the current location information for the reporting vehicle.

The information is also stored (at 226) for subsequent compilation into report form. Thereafter, the host controller 90 instructs the remote cellular unit to disconnect the call (at 210). The call is disconnected and the cycle restarted upon the receipt of a call from the mobile cellular unit.

Thus, operation of the locating and communicating method and apparatus as described combines locating and communicating capabilities in a system utilizing existing cellular telephone system services and information. The cellular system currently in use today consists of many transmitter sites in and around cities, each constituting a cell. Some of the transmitter sites are as close to one another as one mile or less in dense traffic areas. In the outermost regions of a service area, the cell transmitter sites work at higher power levels and are spaced further apart. A network grid across a city is formed by the adjoining cells to provide uninterrupted communication for a mobile telephone unit using cell site handoff techniques as the vehicle travels between cells.

When in a coverage area, the mobile cellular unit receives an overhead message stream continuously transmitted from each cell transmitter site. The mobile cellular unit automatically tunes to the strongest signal, that being the signal transmitted from the nearest cell transmitter site. In this manner, the mobile cellular unit is able to receive instructions from the cellular network as to when and where the mobile unit should re-tune to another voice channel in the next nearest transmitter site before the vehicle has moved out of range of the last transmitter site.

The location apparatus of the present invention includes a microprocessor connected to a modem in turn connected to an 800 MHz mobile cellular radio transceiver in each vehicle. At the trucking base terminal or home office, a host controller is connected through a modem to the cellular transmitter for communicating with the mobile cellular unit and microprocessor installed in the vehicle. As the vehicle travels from cellular system to cellular system and from cell to cell within each cellular system, the mobile cellular unit receives overhead message streams transmitted from cellular transmitter sites located in the individual cells. Information such as the particular SID number, and the number of a particular cell from where the overhead message stream is being transmitted is contained in the message stream. The microprocessor connected to the mobile cellular unit periodically interrogates the unit to obtain the SID number and other location information carried in the overhead message stream at the time of the interrogation. In the event longitude and latitude coordinates of the physical location of the particular transmitter site transmitting the overhead message stream are added to the information transmitted, the microprocessor is capable of interrogating the mobile cellular unit to determine the longitude and latitude location of the vehicle.

Strength of the radio signal carrying the message stream is also determined by the microprocessor at the time of interrogation. If the microprocessor reads a certain minimum radio signal strength and/or a predetermined period of time has elapsed, the microprocessor automatically instructs the cellular radio transceiver to initiate a telephone call to the host controller on the particular cellular system providing service at that time.

At the base terminal or home office, the host controller receives the telephone call and instructs the microprocessor, via a proprietary error correcting protocol, to transmit information over the cellular system to the host controller. The host controller requires the transmission of such information as the SID number, and the cell number and transmitter coordinates, received by the cellular transceiver from the overhead message stream, and in some cases requires transmission by the driver of the vehicle of information stored in a memory connected to the mobile cellular unit.

Information stored by the vehicle driver includes such information as the identity of the vehicle, the number of hours the driver has been at the wheel, or other information based upon the needs of the locating and communicating system user. A voice actuation feature and a hands free microphone connected to the mobile cellular transceiver allow the driver to automatically enter information regarding driver hours, vehicle identity and other requested information without having to lift the handset.

Upon receipt of the information, the host controller looks up the SID number in a database associated therewith to determine the geographical location of the SID number, thereby determining the location of the vehicle. The vehicle location is then highlighted on a map displayed on a screen connected to the host controller. Additional information regarding driver hours, location of the vehicle, or any other requested information, is displayed in text on the screen whereon the map indicating geographical location is displayed. Thus, the operator of the host controller can immediately see the location of the reporting vehicle and read pertinent information reported by the vehicle.

Information enabling the host controller operator to initiate a telephone call to establish voice communication with the vehicle driver is also contained in the database associated with the host controller. Information reported from the vehicle is stored in a memory associated with the host controller for subsequent review, analysis, or compilation into reports covering varying time periods and numbers of vehicles.

The database installed in the host controller also contains information regarding cell identification numbers and longitude and latitude coordinates for a specific transmitter site within the cells in the event that a particular cellular system includes such information in the overhead message stream. By adding an identification number of the transmitting cell and the longitude and latitude coordinates for the cell transmitter site to the message stream, the location of the vehicle is more accurately determined. Assuming that the mobile cellular unit would always tune to the nearest transmitter, the accuracy of the vehicle location would be approximately a radius equal to one-half the distance between the transmitter site to which the mobile unit is tuned and the next nearest site. Thus, a more accurate geographical location of the vehicle is determined.

By utilizing a voice activated mobile cellular unit, the base terminal or home office accurately monitors the location of each vehicle by means of conventional triangulation location techniques using cellular transmitters located in adjacent cells in a cellular system, as well as obtains voice contact with the driver of the vehicle at any time, utilizing existing cellular systems and system information. Thus the locating and communicating system alleviates the need for systems and equipment limited only to vehicle tracking, increases the ease of driver/base accessibility, and avoids driver distraction while communicating with and reporting to the base terminal or home office.

In a locating system incorporating a second embodiment of the present invention, as shown in the block diagram of FIG. 5, the entire apparatus of the locating system is contained within a vehicle to allow the driver to ascertain the current location of the vehicle utilizing the information transmitted in the cellular system overhead message stream. The in-vehicle locating system comprises a microprocessor 250 having an associated read only memory 252 containing a control program, an associated random access memory 254 for storing data input by the driver, and an associated external memory port 256 for receiving plug-in modules containing maps, directories, and other information regarding a particular geographical area.

A graphic display 258 for showing the geographical location of the vehicle and display of textual information is connected to the microprocessor 250 in the vehicle. An interface 260 provides for communication between the microprocessor 250 and the graphic display 258. A smart modem 251 connects the microprocessor 250 through the audio multiplexer 259 to the mobile cellular unit to allow communication between the microprocessor and the mobile cellular unit.

As with the first embodiment of the present invention, the microprocessor 250, through use of an interface 264 automatically interrogates or the driver may select a menu function through use of a keyboard 262 connected to the microprocessor to initiate interrogation of the mobile cellular transceiver 266 over the cellular phone bus 268 to obtain location information from the overhead message stream received by the mobile cellular unit through an antenna 270. Upon receipt of the location information from the overhead message stream, the microprocessor 250 looks up the information in a database associated with the microprocessor 250 to determine the geographical location of the vehicle. The geographical location is then highlighted on a map displayed on the geographic display 258 connected to the microprocessor 250.

The particular map displayed depends upon the plug-in modem presently installed in the external memory port 256 connected to the microprocessor 250. Through use of the keyboard 262, the driver may select particular points of interest from the various directories contained in the plug-in modules. Various menu selections allow the driver to initiate calls to the particular points of interests, highlight the location of the points of interest on the map displayed, and receive textual information regarding the estimated travel time to reach the selected points of interest from the present vehicle location. Further, through use of the keyboard 262, the driver may zoom or pan the map displayed on the graphic display 258 to obtain more detailed information.

As with the first embodiment of the present invention, the mobile cellular unit is equipped with a handset 272, and has attached a voice recognition/activation device 274 and a hands-free microphone 276 to allow operation of the locating system with less driver distraction and safer vehicle operation. As with the locating system incorporating the first embodiment of the present invention, the in-vehicle locating system incorporating the second embodiment of the present invention utilizes the system identification number of the particular cellular system providing service, the cell identification number where the mobile cellular unit is receiving the overhead message, and the longitude and latitude coordinates of a particular cell transmitter site, all of which may be transmitted in the overhead message stream from a particular cell transmitter site.

Although preferred embodiments of the invention have been illustrated in the accompanying drawings and described in the foregoing Detailed Description, it will be understood that the invention is not limited to the embodiments disclosed, but is capable of numerous rearrangements and modifications of parts and elements without departing from the spirit of the invention.

I claim:

1. A system for locating and communicating with vehicles by means of a network of cellular telephone communication systems comprising:
    a host controller;
    a cellular telephone in at least one vehicle operable to receive location data from a particular cellular telephone system providing service to the vehicle;
    at least one microprocessor coupled to the cellular telephone for receiving the location data from the cellular telephone;
    a modem coupled to the microprocessor for transmitting the location data from the microprocessor to the host controller over the particular cellular telephone system; and
    a display coupled to the host controller for displaying graphically a map location of the vehicle and for displaying textually other data transmitted by the modem.

2. The locating and communicating system of claim 1, wherein the microprocessor is operable to receive from the cellular telephone an identification number assigned in the particular cellular telephone system to a particular cell to provide the longitude and latitude of a particular transmitter site in the particular cell of the particular cellular telephone system providing service to the cellular telephone to determine the geographical location of the vehicle.

3. The locating and communicating system of claims 1, further comprising a clock coupled to the microprocessor to determine predetermined time intervals for initiating data communication from the modem to the host controller.

4. The locating and communicating system of claim 1, wherein the host controller is operable from the host controller to remotely program authorized telephone numbers stored at the vehicle.

5. The locating and communicating system of claim 1, wherein the microprocessor is operable to inhibit dialing of unauthorized telephone numbers.

6. The locating and communicating system of claim 1, further comprising a monitor coupled to the microprocessor to monitor vehicle performance information.

7. The locating and communicating system of claim 1, further comprising a memory coupled to the microprocessor to store vehicle performance information for transmittal by the modem to the host controller.

8. The locating and communicating system of claim 1, wherein the microprocessor is operable to read the signal strength received by the cellular telephone from the particular cellular telephone system providing service to the vehicle, the microprocessor further operable to determine if the signal strength is sufficient to authorize initiation of a call from the cellular telephone to the host controller.

9. The locating and communicating system of claim 1, wherein the host controller is operable to store vehicle information for compilation into a report.

10. A method for locating a reporting vehicle equipped with a cellular telephone comprising;
receiving at the cellular telephone information to determine the location of the reporting vehicle;
receiving at the reporting vehicle a system identification number emitted by a serving cellular telephone system;
verifying the system identification number to determine whether to initiate a call from the cellular telephone;
establishing a data modem communications link between the cellular telephone and a remote host controller upon verifying the system identification number;
transmitting over the data modem communications link to the remote host controller the identity of the reporting vehicle and information to determine the location of the reporting vehicle;
interrogating a database of the remote host controller in response to information received from the reporting vehicle to determine the geographic location of the reporting vehicle; and
graphically displaying on a display of the remote host controller the geographic location of the reporting vehicle.

11. The locating method of claim 10, further comprising the step of generating an alarm connected to the remote host controller when the reporting vehicle moves into a strong signal area.

12. The locating method of claim 10, further comprising the steps of:
storing the information to be transmitted to the remote host controller;
compiling the stored information into a report identifying the location of the reporting vehicle for a predetermined period of time; and
transmitting the report to the remote host controller over the data modem communications link.

13. The locating method of claim 10, further comprising the step of measuring the time following transmission of information from the cellular telephone to the remote host controller and initiating transmission of information from the cellular telephone to the remote host controller upon lapse of a predetermined time period.

14. The locating method of claim 10, further comprising the step of remotely programming authorized telephone numbers in the cellular telephone from the remote host controller for inhibiting dialing of telephone numbers from the cellular telephone other than the authorized telephone numbers.

15. The locating method of claim 10, wherein the step of interrogating a database comprises the step of identifying a cellular telephone system providing service to determine a geographical location of the reporting vehicle.

16. The locating method of claim 10, wherein the step of interrogating a database comprises the step of identifying a cell identification number obtained for a particular cell in the cellular telephone system providing service.

17. The locating method of claim 10, wherein information transmitted over the data modem communication link comprises the longitude and latitude of a transmitter site located in a particular cell of the cellular telephone system providing service.

18. A system for locating a vehicle using a cellular telephone network comprising:
a position locating receiver on the vehicle operable to receive geographic location data from a position locating system, the geographic location data providing an approximate location of the vehicle;
a cellular transceiver coupled to the position locating receiver operable to transmit over the cellular telephone network via a data modem a vehicle identification number and geographic location data provided by the position locating receiver; and
a remote host controller coupled to the cellular telephone network operable to receive geographic location data sent by the data modem upon receiving and validating the vehicle identification number, the remote host controller further operable to process and display graphically on a map the approximate location of the vehicle based on the geographic location data, the remote host controller including:
a database containing a roamer number of a particular cellular telephone system serving an area including the approximate location of the vehicle; and
a communications device for placing calls from the remote host controller to the vehicle using the roamer number.

19. The locating system of claim 18, wherein the position locating system is a land-based system.

20. The locating system of claim 18, wherein the remote host controller further comprises at least one microprocessor for computing the approximate location of the vehicle based on a destination and approximate route of the vehicle.

21. A method for locating a vehicle equipped with a cellular transceiver using a cellular telephone system comprising:
receiving geographic location data of the vehicle from a position locating system;
establishing a data modem communication link between the cellular transceiver and a remote host controller;
interrogating the cellular transceiver for a vehicle identification number;
accepting at the remote host controller the geographic location data upon receipt of a valid vehicle identification number;

determining the approximate location of the vehicle by interpreting the geographic location data;

interrogating a database to obtain an access number of a particular cellular telephone system serving an area including the approximate location of the vehicle; and placing a call from the remote host controller to the vehicle using the access number.

22. The locating method of claim 21, wherein the step of receiving geographic location data further comprises receiving geographic location data from a land-based position locating system.

23. The locating method of claim 21, wherein the step of accepting at the remote host controller comprises accepting mechanical performance information of the vehicle.

24. The locating method of claim 21, further comprising the following steps:

determining the location of the vehicle during the last transmission; and calculating the distance travelled in the time elapsed to determine the approximate location of the vehicle.

* * * * *